May 9, 1961  F. P. CHAUVIN  2,983,094
GRASS CUTTINGS RECEIVER
Filed March 4, 1959

Ferdinand P. Chauvin
INVENTOR
BY *Harold A. Levey, Jr.*
ATTORNEY 2,983,094
GRASS CUTTINGS RECEIVER
Ferdinand P. Chauvin, 2301 Pauline St., New Orleans, La.
Filed Mar. 4, 1959, Ser. No. 797,285
1 Claim. (Cl. 56—194)

This invention relates to attachments for grass cutters and is particularly concerned with a detachable receiver for use with cutters of the type wherein the cutting blade is mounted on a vertical shaft for rotation in a horizontal plane.

While there are many types of grass cuttings receivers commercially available for use with rotary grass cutters, they have one or more disadvantageous features. Some types of receivers may be used only with specific brands of cutters or are limited in use to a specific cutter discharge chute geometry. Other types of receivers have peculiar attachment means which necessitate relatively extensive modifications of the discharge chute or mower housing, or both. Such attachment means very often involve the use of brackets, collars, clamps, etc. and are permanent in nature. In addition, many receivers, once attached to the cutter, cannot be easily detached for the purpose of emptying accumulated cuttings.

By the use of the present invention, all cuttings ejected through a discharge chute enter an enclosed receptacle which is simply mounted on any rotary mower. The only adaptation a manufacturer need make is to drill three holes in the chute; one on the top, and one on each side. The cutting receptacle has a plurality of slots therein positioned to cooperate with simple bolts or pins fixed in the holes in the mower housing. Actually, if the top slot is placed over the bolt in the top hole, the receptacle can then be released and permitted to engage the remaining slots and bolts as it swings downward. This arrangement also insures that the receptacle's own weight will act to hold it in place. The ease with which it can be detached for emptying an accumulation of cuttings is apparent. Since the discharged material enters the receptacle entrained in an air stream, provision must be made for the escape of said air. To this end the receptacle is formed of a framework of angle irons, and a screening or mesh is affixed thereto in any suitable manner. The only unscreened portion of the frame is that which is to be connected to the discharge chute of the cutter.

It is therefore an object of this invention to provide an improved detachable cuttings receiver for rotary grass cutters.

It is another object of the invention to provide an improved cuttings receiver having the highly desirable feature of rapid and facile attachment or removal.

Still another object of the invention is to provide a simple and inexpensive cuttings receiver which requires no actual modification or alteration of any rotary cutter with which it may be employed.

In accordance with the present invention there is provided a cuttings receiver for attachment to the discharge chute of a rotary grass cutter. The chute has a bolt through its top wall and other bolts through each of its side walls. The receiver comprises an upper framework, a lower framework, and a plurality of supports holding the frameworks in spaced, substantially parallel relation. Two of the supports form an opening through which a discharge chute will fit. A slot is in each of the two supports, these slots having upwardly turned ends. A screen mesh material is mounted over the receiver except for the area of the opening.

For a better understanding of the present invention, together with other and further objects thereof, reference is made to the following description, taken in connection with the accompanying drawings, and its scope will be pointed out in the appended claim.

Figure 1:
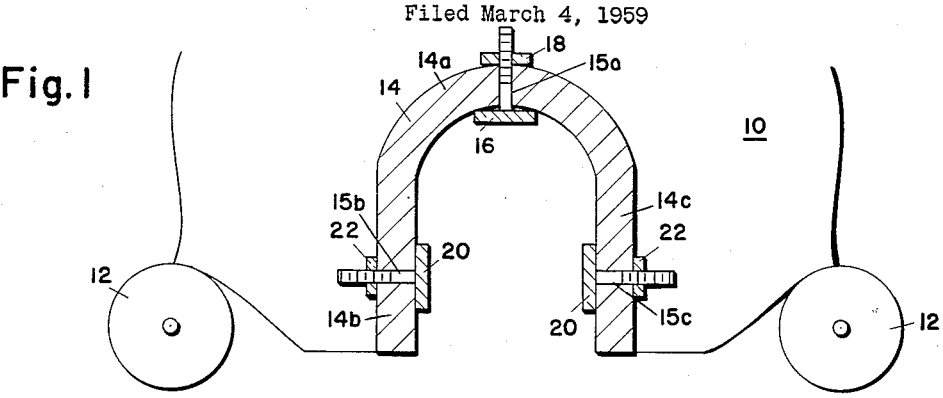
Fig. 1 is a side elevation partly in section of a rotary cutter adapted to receive the cuttings receptacle of the present invention.
Figure 2:
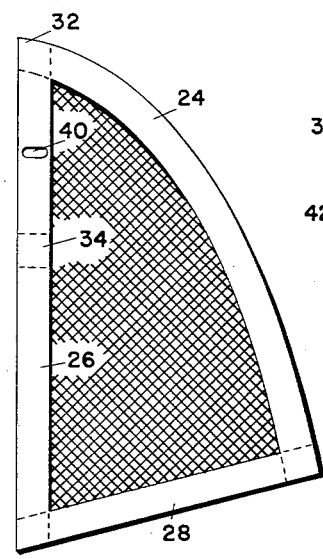
Fig. 2 is a top plan view of the receptacle of the present invention.
Figure 3:
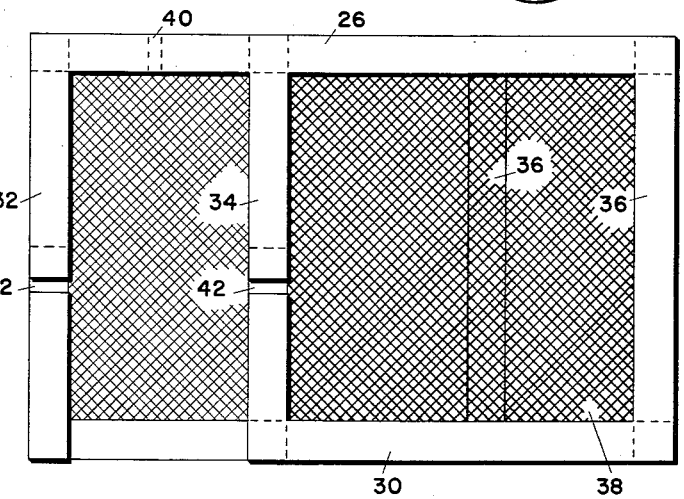
Fig. 3 is an elevation of the apertured end of the receptacle of the present invention which attaches to the discharge chute of a rotary mower.
Figure 4:
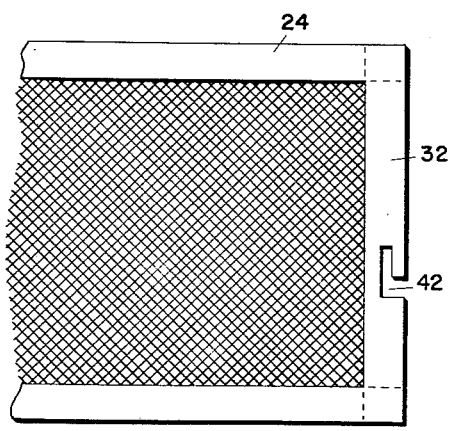
Fig. 4 is a partial side elevation of the receptacle of the present invention.

In Fig. 1, the reference character 10 designates the housing or body of a rotary type grass cutter shown diagrammatically therein. Rotary type grass cutters are old and well known in the art. A cutter of this type is shown, for example, in U.S. Patent No. 2,851,844, issued September 16, 1958, to V. Bailey. The cutter has wheels 12 and a discharge chute 14 through which cuttings are ejected. Although this specific model of cutter shows a side chute, it should again be made clear that the receptacle may be employed regardless of the direction in which such chute extends. A plurality of holes 15a, 15b and 15c are drilled through the chute 14. One of these holes is at the top 14a of the chute 14 and receives a bolt 16, the head of which abuts the inner face of the chute. A lock nut 18 secures the bolt 16 in place. The remaining holes are positioned one in each side 14b and 14c of the chute 14. Each is near the bottom of the chute and adjacent its outer edge. A bolt 20 extends through each of these latter holes and is held in place by a lock nut 22.

The illustrated embodiment of the novel receptacle of the present invention is constructed of a framework of angle irons. The upper portion of the frame consists of a curved section 24, a long, straight front section 26 and a shorter side section 28. The base of the receptacle is formed by sections which are substantially identical with the curved and short sections 24 and 28. The front member of the base consists of an angle iron 30 similar to section 26 except that the vertical portion of iron 30 is cut away between a pair of upright supports 32 and 34. The chute 14 of the cutter fits between such supports, and this cut away portion provides an unobstructed passage for ejected cuttings. If desired, the front base section may be made of two members; an angle iron from support 34 to the outer edge and a flat bar between the supports 32 and 34. The upper and base portions are held in spaced relation by other supports 36 positioned at the junctions of section 28 with each of sections 24 and 26. A wire mesh or screening 38 covers the entire framework with the exception of the space between the supports 32 and 34. Any suitable method may be employed to secure the mesh 38 to the framework.

In order to mount the receptacle on a rotary cutter, a short slot 40 is cut in the section 26. The supports 32 and 34 are each provided with bayonet slots 42. These latter slots are formed with upturned end segments. When it is desired to set the receptacle in place, the slot 40 is simply fitted over the bolt 16. The receptacle may then be pivoted downwardly around this bolt, and the slots 42 will engage the bolts 20 to hold the parts in assembled relation. When the framework requires emptying, it may be removed simply by disengaging the bolts 20, and lifting off of the bolt 16.

The spacing between supports 32 and 34 should be great enough to permit any standard discharge chute to pass therebetween. If a particular model cutter has a chute which is considered narrower than average, it is only necessary to use bolts 20 of greater length. In other words, the length of the bolts plus the width of the chute should slightly exceed the distance between the supports.

While there has been described what is at present considered to be the preferred embodiment of this invention, it will be obvious to those skilled in the art that various changes and modifications may be made therein without departing from the invention and it is, therefore, aimed in the appended claim to cover all such modifications as fall within the true spirit and scope of the invention.

What is claimed is:

A unitary, rigid cuttings receiver for attachment to the discharge chute of a rotary grass cutter, said chute having pins extending outwardly through its top wall and each of its sidewalls for supporting said receiver, said receiver comprising: an upper frame including a first straight support member connected to a second straight support member, said second member being shorter than said first member and at an acute angle relative thereto, and a curved support member connected to said first and second members for forming said upper frame; a lower frame having the same shape as said upper frame; a plurality of uprights having their ends connected to said frames for holding said frames in horizontal spaced relationship including, a first upright positioned at the junction of said first and curved support members, and a second upright positioned along said first support member so that the distance between said first and second uprights is slightly larger than the width of said discharge chute to enable engagement therewith, said upper frame first support member having a slot therein, said slot being disposed between said first and second uprights and being adapted for engagement with said pin extending through said top wall of said chute, and first and second uprights each having a bayonet slot therein adapted for engagement with said pins extending from said sidewalls of said chute; and screening material extending between said support members forming said upper and lower frames and between each of said uprights except said first and second uprights whereby the space between said first and second uprights is open to receive cuttings, thereby providing said receiver.

References Cited in the file of this patent

UNITED STATES PATENTS

| | | |
|---|---|---|
| 2,494,062 | Sherrow | Jan. 10, 1950 |
| 2,747,356 | Peterson | May 29, 1956 |
| 2,783,604 | Cahill | Mar. 5, 1957 |
| 2,851,844 | Bailey | Sept. 16, 1958 |